March 10, 1959     B. ANDRIC     2,876,666
TOOL FOR REFORMING DEFORMED FASTENER PARTS
Filed Aug. 2, 1957
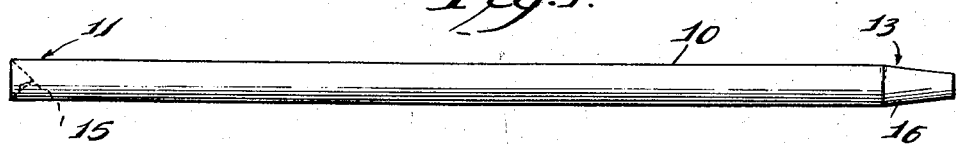
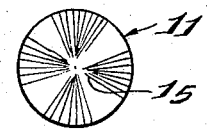 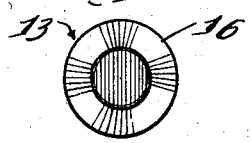
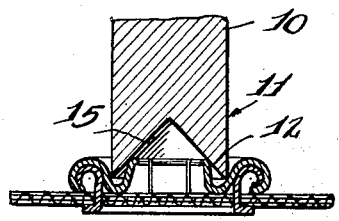 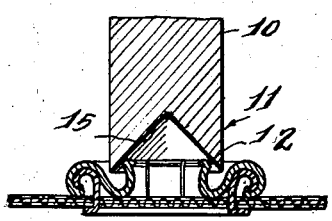
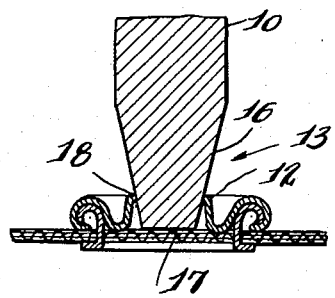 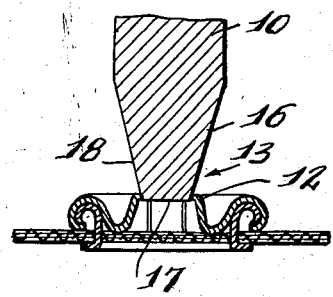
Inventor.
Boris Andric.
Attorneys.

United States Patent Office
2,876,666
Patented Mar. 10, 1959

2,876,666
TOOL FOR REFORMING DEFORMED FASTENER PARTS

Boris Andric, Westmont, Ill.

Application August 2, 1957, Serial No. 675,955

4 Claims. (Cl. 81—15)

This invention relates to a forming tool and in particular to a tool for adjusting the configuration of a portion of a snap fastening element.

A conventional form of snap fastener well known in the art is that comprising a female, annular element and a removably associated male, protuberant element having a globular end adapted to snap into the outer end of the female element. One disadvantage of such fastening elements is that, as a result of substantial use, the female element tends to become radially enlarged whereby proper snap retaining action with the male element is lost. Alternatively, when such fastening elements are submitted to pressure application, such as by the wringer of a washing machine, the female element tends to become radially constricted thereby making it difficult to insert properly the male element to have snap fastening association therewith.

Because of the relatively small nature of the female fastening element, the elimination of such deformation thereof with presently known tools, such as pliers, is difficult and unsatisfactory. Further, because such a tool acts primarily only on diametrically opposite portions of such an annular fastening element, it is extremely difficult to effect a uniform constriction or expansion of the entire circumferential extent of the element.

The principal object of this invention is to provide a new and improved tool for adjusting the internal diameter of the annular element of a snap fastener.

Another object is to provide such a tool having means for engaging the annular element over the entire circumferential extent thereof to effect uniform constriction thereof.

A further object is to provide such a tool wherein such means are defined by a conically recessed portion of the tool body, allowing such uniform constriction of the annular element by simple longitudinal movement of the tool body axially of the recess and toward the annular element.

Still another object of the invention is to provide such a tool wherein the body portion comprises a cylinder having an outer diameter equal to the outer diameter of the conical recess, permitting the tool to engage properly the annular fastening element notwithstanding the disposition of obstructions closely adjacent and radially outwardly of the fastener portion engaged by the male portion of the fastener.

A still further object is to provide a new and improved tool for adjusting the internal diameter of an annular fastening element comprising a body member having a frustoconical, outwardly narrowing projecting adapted to be inserted into the central opening of the annular fastening element to expand the element radially outwardly by longitudinal movement of the tool.

Yet another object is to provide such a tool wherein the length of the projection between the narrow outer end thereof and the plane of the portion thereof having a diameter equal to the desired internal diameter of the annular fastening element is no greater than the axial length of the annular fastening element.

A yet further object is to provide such a tool arranged to limit automatically the insertion of the tool into the annular fastening element to the extent proper for expanding the fastening element to the desired internal diameter.

Still another object of the invention is to provide such a tool having integral means for uniformly constricting and expanding the annular fastening element, wherein the tool comprises a rod having the expanding means formed integrally at one end thereof and the constricting means formed integrally at the opposite end thereof.

A still further object is to provide such a tool wherein the constricting and expanding means are each arranged to be struck with a hammer so as to permit the transmission of the striking force through the rod and cause the means at the opposite end of the rod to coact with the annular fastening element and effect the desired adjustment of the internal diameter thereof.

Other features and advantages of this invention will be apparent from the following description taken in connection with the accompanying drawings, wherein:

Fig. 1 is a side elevation of a tool embodying the invention;

Fig. 2 is an end view thereof showing the means for effecting a constriction of an annular fastening element;

Fig. 3 is an opposite end view thereof showing the means for effecting a radial enlargement of an annular fastening element;

Fig. 4 is a fragmentary, enlarged longitudinal section of the constricting means thereof, disposed in operative position with a female fastening element having an undesirably large internal diameter;

Fig. 5 is a view similar to that of Fig. 4 with the constricting means disposed as at the end of the constrictive adjusting operation;

Fig. 6 is a fragmentary, enlarged longitudinal section of the expanding means thereof disposed in operative position with a female fastening element having an undesirably small internal diameter;

Fig. 7 is a view similar to that of Fig. 6 but with the expanding means disposed as upon the completion of the expanding operation; and Fig. 8 is an enlarged longitudinal section of the complete snap fastener.

In the exemplary embodiment of the invention as disclosed in the drawings, a forming tool is shown as adapted for use with a conventional snap fastener to adjust the internal diameter of the female element thereof. Both constricting and expanding means are incorporated integrally in the tool so that either or both constricting and expanding operations may be readily effected in the adjustment of the internal diameter of the female element.

More specifically, the forming tool comprises a body 10 provided with an end defining means 11 for constricting a female, annular fastening element 12 of a conventional snap fastener. The opposite end of the body defines means 13 for expanding female fastening element 12. Each of constricting means 11 and expanding means 13 is arranged to act on fastening element 12 so as to adjust the internal diameter to be slightly less than the external diameter of a globular end 14a of a conventional male, protuberant portion 14 of the snap fastener. When the internal diameter of element 12 is as desired, as seen in Fig. 8, male element 14 may have proper snap-locked association therewith. Should the diameter of element 12, however, be greater than the desired diameter, it is obvious that the male element 14 will not be properly locked in association with the female element, as globular end 14a will not be properly snapped into retained relationship with the female element 12. Alternatively, when the diameter of female element 12 is smaller than the desired diameter, proper insertion of globular end 14a thereinto is prevented or made extremely difficult, either of which conditions is highly undesirable. It is the function of constricting means 11 and expanding means 13 to effect the adjustment of the diameter of internal female element 12 to the desired diameter, thereby eliminating either of such undesirable conditions.

In the illustrated embodiment, body 10 comprises an elongated rod, preferably formed of a rigid material, such as steel, adapted to transmit therethrough a substantial force, such as produced by a hammer, and cause either of means 11 and 13 engaging female fastening element 12 to adjust the internal diameter thereof as desired. As best seen in Figs. 1 and 2 constricting means 11 comprises a conical recess 15 opening longitudinally outwardly of the rod. The outer diameter of recess 15 is preferably appreciably greater than the normal external diameter of female fastening element 12 to permit engagement of constricting means 11 with female fastening element 12 notwithstanding an undesirable diametric enlargement thereof. Thus, by making the outer diameter of recess 15 greater than the external diameter of the male fastening element 14a by the difference between the external and internal diameters of the annular fastening element 12, means 11 is properly operative to adjust element 12 for all deformations resulting from normal use of the fastener.

To avoid interference with constricting means 11 by associated portions of the fastener normally surrounding female element 12, the outside diameter of the end portion of body 10 defining means 11 is effectively minimized, and in the illustrated embodiment is made equal to the outer diameter of recess 15. As shown in Fig. 1, the entire body 10 may be provided with this external diameter.

Expanding means 13 comprises a frusto-conical projection 16 narrowing outwardly from body 10. The minimum diameter of projection 16 is preferably appreciably less than the desired internal diameter of annular fastening element 12 to allow insertion of the end of means 13 through fastening element 12 notwithstanding undesirable constriction thereof from the desired configuration. It is preferred that the length of projection 16 between the outer narrow end 17 thereof and the plane of a portion 18 thereof having a diameter equal to the desired internal diameter of the annular element 12 be no greater than the axial length of the annular element 12. As best seen in Fig. 7 of the drawings, adjustment of the internal diameter of annular element 12 to the desired diameter is effected automatically by making the length of projection 16 between end 17 and the plane of portion 18 exactly equal to the axial length of the annular element 12.

To illustrate the use of the tool, assume that annular element 12 is undesirably radially enlarged, as seen in Fig. 4. The tool is positioned with constricting means 11 in operative association with annular element 12 by arranging annular element 12 to extend coaxially into recess 15. Element 12 is then supported against longitudinal movement by suitable means (not shown) and end 17 of projection 16 is struck with a suitable tool such as a hammer (not shown) to urge forcibly means 11 against annular element 12. This results in a constriction of annular element 12, causing the internal diameter of the annular element to be provided with the desired internal diameter as seen in Fig. 5.

Should the internal diameter of annular element 12 be originally smaller than the desired internal diameter, expanding means 13 is employed to effect the desired adjustment. Thus, as seen in Fig. 6, projection 16 is coaxially inserted into the annular element. The end of body 10 defining means 11 is then struck with a hammer to urge projection 16 longitudinally, forcibly into annular element 12, until the internal diameter is adjusted to be the desired internal diameter, as seen in Fig. 7.

Because of the integral association of each of means 11 and 13, overadjustments of the internal diameter of the element 12 by either of said means may be readily corrected by utilization of the opposite means. Further, because of the coaxial alignment of means 11 and 13, each of the means may serve as suitable force transmitting means to be engaged by the force delivering mechanism, such as a hammer, permitting substantial simplification of the tool structure.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A tool for adjusting the internal diameter of an annular fastening element arranged to have snapped association with the globular end of a protuberant fastening element to be slightly less than the external diameter of the globular end, comprising a rigid body provided with an outwardly opening conical recess having an outer diameter appreciably greater than the external diameter of the annular fastening element, whereby the wall of said body defining the recess may be urged against and constrict the annular fastening element by movement of said body in the direction of the axis of said recess.

2. The tool of claim 1 wherein the outer diameter of said recess is greater than the outer diameter of the globular end of the protuberant fastening element by the difference between the external and internal diameters of the annular fastening element.

3. The tool of claim 1 wherein the portion of the body provided with said recess is elongated and has a limited transverse extent.

4. The tool of claim 3 wherein the portion with said recess is cylindrical and has an external diameter equal to the outer diameter of said recess.

References Cited in the file of this patent

UNITED STATES PATENTS

| | | |
|---|---|---|
| 278,599 | Robinson | May 29, 1883 |
| 866,644 | Green | Sept. 24, 1907 |
| 1,479,741 | Reitz | Jan. 1, 1924 |
| 2,737,836 | Nicholson | Mar. 13, 1956 |
| 2,810,312 | Mueller | Oct. 22, 1957 |
| 2,814,223 | Cheatle | Nov. 26, 1957 |